FIG. 2.
COMPARISON OF CATALYSTS OF EXAMPLES 1 AND 2
WITH HEAVY MID-CONTINENT GAS OIL
⊙ CATALYST OF EXAMPLE 1
△ CATALYST OF EXAMPLE 2
BENCH FCC TEST CONDITIONS: HMCGO, 925°F, 5 C/O, 5WHSV
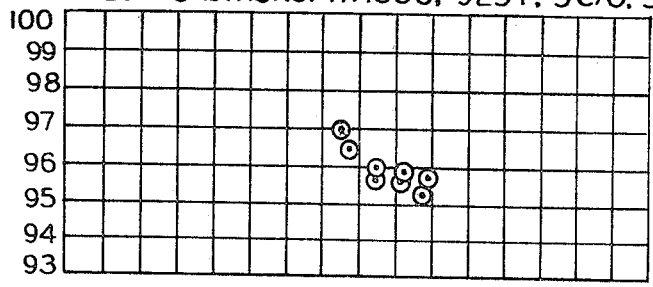
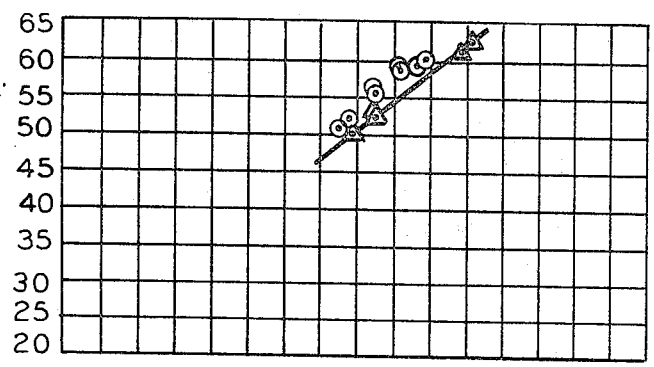
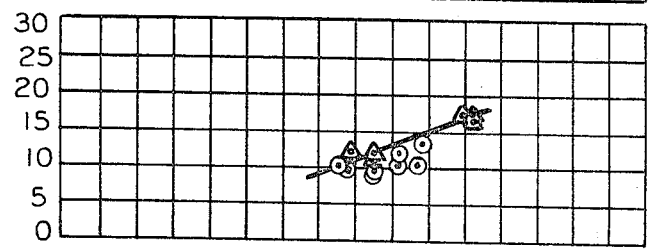
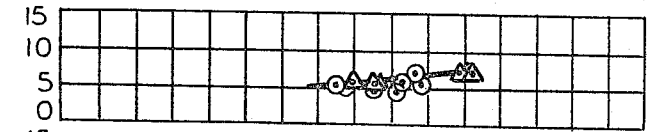
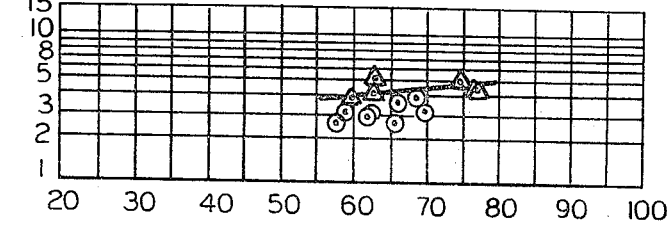
CONVERSION, % VOL.

United States Patent Office 3,553,104
Patented Jan. 5, 1971

3,553,104
CATALYST MATRIX MATERIAL, COMPOSITE CATALYST, AND METHODS OF PREPARING SAME
William A. Stover, Woodbury, and Harry A. McVeigh, Laurel Springs, N.J., assignors to Mobil Oil Corporation, a corporation of New York
Continuation-in-part of application Ser. No. 627,429, Mar. 31, 1967. This application Dec. 26, 1967, Ser. No. 701,026
Int. Cl. B01j 11/40; C10g 11/02
U.S. Cl. 208—120
36 Claims

ABSTRACT OF THE DISCLOSURE

Catalyst matrix material for carrying active catalytic component. Matrix made up of (1) 20 to 95 wt. percent porous silica gel or silica-zirconia gel, the gel having pore volume of at least about 0.6 cc. per gram and (2) 5 to 80 wt. percent of weighting agent, such as clay. Method of preparing such matrix. Also discloses a composite catalyst made up of crystalline aluminosilicate particles contained in such matrix, the overall composite having a packed density of at least 0.3 gram/cc. Composite made by admixing with an aqueous alkali metal silicate a particulate weighting agent such as clay, desirably dispersed in water, so as to coat the clay with alkali metal silicate, ageing at a pH of from about 8 to 10, optionally adding a zirconium salt, desirably as an aqueous solution, reducing the pH to about 4.0 to 7.0 to form a silica gel-weighting agent or a silica gel-zirconia gel-weighting agent matrix slurry, admixing a slurry of crystalline aluminosilicate, and drying in the form of particles suitable for fluid catalytic conversion.

CROSS-REFERENCES TO RELATED APPLICATIONS

This application is a continuation-in-part of our application Ser. No. 627,429, entitled "Composite Catalyst and Method of Preparing Same," filed Mar. 31, 1967 and now abandoned.

BACKGROUND OF THE INVENTION

(1) Field of the invention

One property of catalyst compositions that is important in a number of applications is particle density. For instance, in moving bed catalytic cracking units, a cracking catalyst of high density is preferably employed to allow greater unit capacity and greater efficiency due to improved catalyst heat capacity.

During catalytic conversion, such as of high boiling hydrocarbons to lower boiling hydrocarbons, the reaction which takes place is accompanied by a number of complex side reactions, such as aromatization, polymerization, alkylation, and the like. As a result of these complex reactions, a hydrocarbonaceous deposit commonly called "coke" is laid down on the catalyst. The deposition of coke tends to impair catalytic efficiency for the principal reaction. As will be realized, undesired products, such as coke, are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e., to provide a catalyst of high activity, but also to afford an enhanced yield of useful product, such as gasoline, while maintaining undesired products, such as coke, at a minimum. The ability of a conversion catalyst so to control and to direct the course of conversion is referred to as selectivity. Thus, an exceedingly useful and widely sought characteristic in a cracking catalyst is high selectivity.

In addition to the desirable properties of high activity and selectivity found in commercial catalytic compositions, it is essential for economic use that a catalyst possess high stability, that is, the ability to maintain high levels of activity and selectivity for extended periods of use in catalytic conversion. The maintenance of high selectivity and activity is, therefore, a measure of catalyst stability.

Thus, a modern conversion catalyst necessarily possesses, in addition to high catalytic activity, the equally desirable properties of high selectivity and stability.

The present invention provides a catalyst unusually suited in each of these respects, as well as a unique matrix material.

(2) Description of the prior art

Patent application Ser. No. 441,356, entitled "Cracking Catalyst and Method of Preparing the Same," filed by one of us on Mar. 9, 1965 and now abandoned, describes a composite catalyst prepared by dispersing particles of crystalline aluminosilicate in a matrix of silica-alumina (the alumina having been precipitated onto the previously formed silica). The contents of said application are incorporated herein by reference.

See also patent application Ser. No. 447,019, filed Apr. 9, 1965, U.S. Pat. No. 3,312,615, the contents of which are also incorporated herein by reference.

Referring to said application Ser. No. 441,356, the composite catalyst described therein is characterized by unusual selectivity. Moreover, such catalyst exhibits rather good stability when employed under a wide range of temperatures. Of course, a catalyst having even greater stability would be of considerable interest.

SUMMARY OF THE INVENTION

The present invention provide a composite catalyst characterized by excellent selectivity and unusual heat stability. Thus, when such catalyst is subjected to thermal treatment over a wide variey of temperatures, e.g., from about 1200 to 1750° F., there is virtually no change in its physical properties, e.g., pore volume, surface area, density, etc.

Such composite catalyst is made up of crystalline aluminosilicate particles contained in a porous silica or silica-zirconia gel matrix the gel having a pore volume of at least about 0.6 cc. per gram. The matrix further includes a weighting agent, preferably clay, in such quantity that the overall composite has a packed density of at least 0.3 gram/cc.

The foregoing composites are made by admixing with an aqueous alkali metal silicate a particulate weighting agent such as, e.g., a kaolin clay, desirably as a dispersion in water, so as to coat the clay particles with alkali metal silicate. This admixing is conveniently done at room temperature although of course higher or lower temperatures may be employed if desired. The mixture is then heated, generally to a temperature of from about 100 to 160° F. and acid is added to adjust the pH to from about 8 to 10. This temperature is maintained for a time of about 1 to 6 hours or longer. At this point, if a silica-zirconia-weighting agent (e.g., clay) matrix is desired, a zirconium salt is added, desirably as an aqueous solution thereof. Acid is then added to reduce the pH to about 4 to 7 and form a silica gel-weighting agent or silica gel-zirconia gel-weighting agent slurry, which is then admixed with a slurry of crystalline aluminosilicate. The resulting composite is separated and dried in the form of particles suitable for fluid catalytic conversion.

The composite catalysts of our invention show unusual selectivity and are particularly desirable in their ability to crack hydrocarbons to relatively high yields of gasoline while having low coking tendencies. This is of great value when dealing with "dirty" feed stocks, e.g., heavy gas oils and "recycle" stocks, which ordinarily give off appreciable coke yields when subjected to cracking.

Our invention further provides a catalyst matrix material, i.e., a matrix material into which a more active catalytic component may be dispersed. As will become apparent from the detailed description hereinafter, such matrix affords numerous advantages over matrices heretofore employed. The matrix comprises (1) from about 20 to 95 wt. percent of porous silica gel or silica-zirconia gel, the gel having a pore volume of at least about 0.6 cc. per gram and an "alpha" ($\alpha$) value of less than 0.1 and (2) from about 5 to 80 wt. percent of a weighting agent, desirably clay. Our invention also includes a method of preparing such matrix.

DESCRIPTION OF THE DRAWINGS

Our invention will be best understood by the following detailed description taken in conjunction with the accompanying drawings wherein:

FIG. 2 is a plot summarizing (1) octane rating against conversion for a catalyst of our invention and (2) product yields for (a) a catalyst of our invention and (b) a "control" wherein the matrix is silica-alumina.

DESCRIPTION OF SPECIFIC EMBODIMENTS

Figure 1:
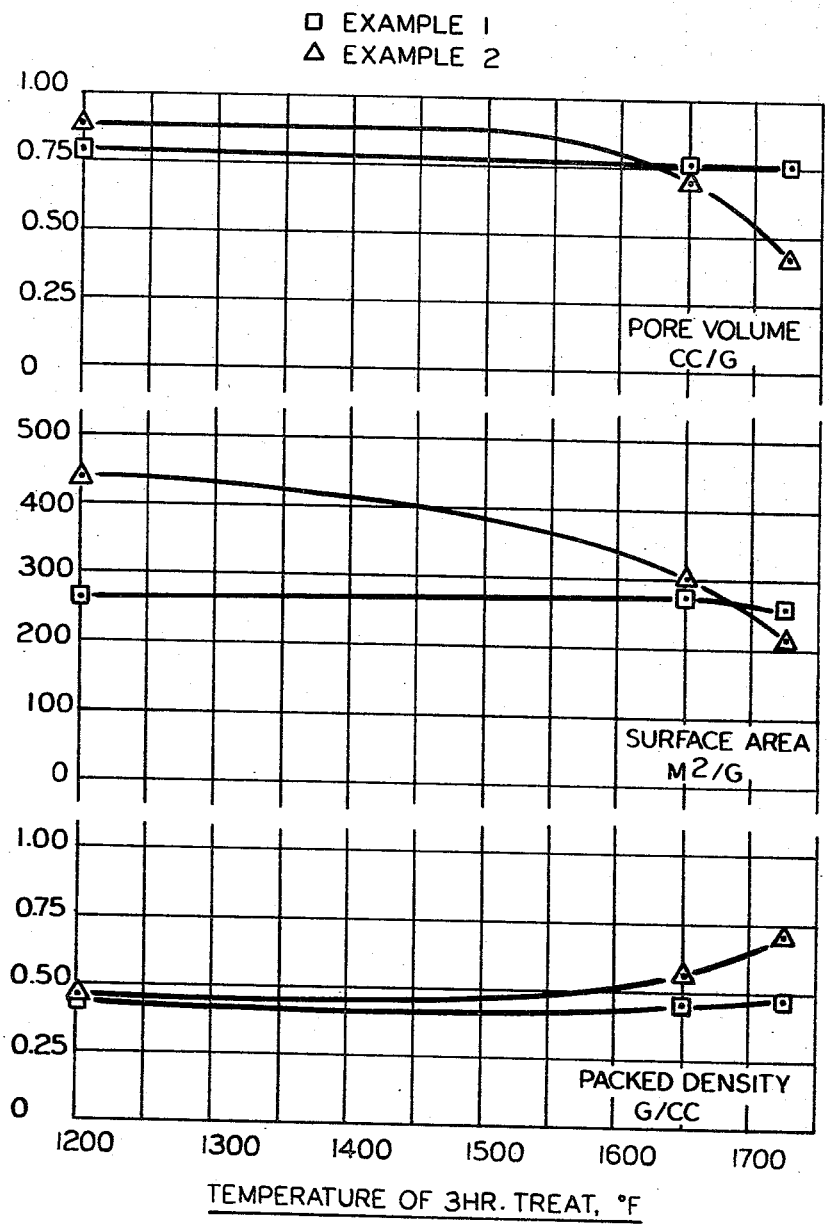
FIG. 1 is a plot of certain physical properties against temperature of heat treatment (1) for a catalyst of our invention and (2) for a "control" wherein the matrix is silica-alumina.

The composite catalysts of our invention are made up of crystalline aluminosilicate particles and has a sodium content of less than about 4 percent by weight, these particles being contained in a porous matrix of (1) synthetic amorphous silica gel or silica-zirconia gel, such synthetic amorphous gel having a pore volume of at least 0.6 cc. per gram, together with (2) a weighting agent, preferably clay, in such amount as to yield a resulting composite having a packed density of at least 0.3 gram per cc. (It is to be understood that when reference is made herein to properties of the composite such as, e.g., packed density, or to properties of the silica gel or silica-zirconia gel such as, e.g., pore volume, these references are to the fresh catalyst composite, i.e., to the composite prior to its actual use in catalytic conversion, but subsequent to the removal of water therefrom, as by heating to a temperature of 1200° F. for three hours in substantially dry air.)

Referring to the synthetic amorphous component, silica gel or silica-zirconia gel, of the composite catalyst matrix, we have found that it is essential that such synthetic amorphous component have a pore volume of at least 0.6 cc. per gram. In general, the higher the pore volume, the more desirable is the overall composite catalyst, of course, provided that the pore volume is not so high as to adversely affect the attrition resistance of the catalyst. Thus, the pore volume of the synthetic amorphous material (silica gel or silica-zirconia gel) is generally from about 0.6 to 1.5 cc. per gram, a more preferred range being from about 0.8 to 1.3 cc. per gram. The most preferable pore volume range is from about 1 to 1.2 cc. per gram.

In addition, and as will be discussed in greater detail hereinafter, it is advantageous that the syntheic amorphous material be such that, if used alone, it would be characterized by substantially no catalytic activity. By "substantially no catalytic activity" we mean that the alpha ($\alpha$) value (defined in detail hereinafter) for the silica gel or silica-zirconia gel is less than 0.1, and desirably less than 0.05.

The matrix for our composite catalyst additionally includes a weighting agent. The most preferred weighting agent is kaolin clay. Other weighting agents may be substituted, in whole or in part, for kaolin clay, so long as such weighting agents do not react with the high porosity silica gel to form compounds that would cause an appreciable change in the pore volume-surface area relationship of the finished catalyst. The amount of weighting agent employed should be such that the final composite catalyst has a packed density of at least 0.3 gram per cc. Generally the packed density of the composite catalyst will be from about 0.3 to 1 gram per cc., a more preferred range being from about 0.4 to 0.6 gram per cc.

In the make up of the matrix, the relative proportions as between the synthetic amorphous material (silica gel or silica-zirconia gel) and weighting agent are advantageously from about 20 to 95% by weight of synthetic amorphous material and from about 5 to 80% by weight of weighting agent. A more preferred range is one wherein the synthetic amorphous material is from about 50 to 70 weight percent of the matrix and the weighting agent is from about 30 to 50 weight percent of the matrix.

Crystalline aluminosilicate particles are dispersed in the foregoing matrix, generally in such quantity that the overall composite contains from about 1 to 80% by weight of such crystalline aluminosilicate particles. Preferably, the composite will contain from about 2 to 20% by weight of crystalline aluminosilicate particles, the most preferred range being from about 5 to 10% by weight.

In preparing our composite catalyst, the particulate weighting agent, e.g., clay, is dispersed in liquid medium, preferably water, to form a dispersion. Advantageously the concentration of weighting agent in the dispersion is from about 0.5 to 10% by weight, and most preferably from about 1 to 3% by weight. The foregoing dispersion is intimately admixed with alkali metal silicate so as to coat the particles of weighting agent therewith. Thus, aqueous alkali metal silicate may be slowly added to the weighting agent dispersion with thorough mixing. The mixing is conveniently carried out at room temperature, although if desired, lower or higher temperatures may be employed. The relative proportions as between the weighting agent dispersion and alkali metal silicate solution are not critical, and merely require that there be present sufficient alkali metal silicate to assure that the particles of weighting agent are coated therewith. Hence, the mixing is thorough so as to insure that the clay is uniformly dispersed and coated with alkali metal silicate.

After mixing, the admixture is subjected to heat ageing at a pH of from about 8 to 10 so as to obtain a high pore volume silica gel. Thus, sufficient acid is added to reduce the pH to from about 8 ot 10, and preferably from about 9.5 to 10. Desirably, sulfuric acid is employed to effect such reduction in pH. The silica concentration at this point will typically be from about 4 to 7% by weight.

If the synthetic amorphous component of the matrix is to be silica-zirconia gel rather than silica gel alone, then at this juncture a source of zirconium ions is added, typically in the form of a zirconium salt, zirconium sulfate being preferred. Desirably an aqueous solution of the zirconium salt is employed.

Neither the concentration nor the amount of zirconium salt solution employed is critical. Thus, each may be adjusted so as to achieve the desired level of zirconia in the overall silica-zirconia-weighting agent matrix. By way of illustration, the concentration of the zirconium salt solution may be of the order of 1% by weight to 30% by weight or even higher, a preferred range being from about 5 to 20% by weight, the most preferred range being from about 10 to 15% by weight.

Likewise, the temperature of the zirconium salt solution is not at all critical. It is generally most convenient to make up the solution at ambient temperature conditions and then add it, although higher or lower temperatures may of course be employed.

Where zirconia is to be present as a component of the silica-weighting agent matrix, it is desirable that the zirconia level of the synthetic amorphous material (silica gel-zirconia gel) be from about 0.5 to 25% by weight on a dry basis. A more preferred range is from about 1 to 10%, with the most preferred range being from about 2 to 5%. As previously pointed out, the desired zirconia level is readily obtained by appropriate selection of concentration and/or amount of zirconium salt solution employed.

Thereafter, the mixture, which may or may not contain zirconium ions, depending upon whether a zirconium salt solution has been added thereto, is heated to a temperature of from about 100 to 160° F., or even higher, and maintained at such temperature for typically from about 1 to 6 hours. Longer ageing times may be employed, but to no particular advantage. As will be apparent, in general, the higher the temperature, the less the time required at that temperature to effect ageing. Thus, the ageing could be carried out at temperatures as long as, e.g., room temperature, but then the time requirements for such ageing would be considerable and the process uneconomical.

After heat-aging, sufficient acid (desirably sulfuric) is added with agitation to reduce the pH to from about 4 to 7 and preferably to from about 4.0 to 5.0, 4.5 to 5.0 being advantageous and 4.0 to 4.5 being most preferred, thereby forming a synthetic amorphous gel oxide (silica gel of silica-zirconia gel)-weighting agent matrix slurry wherein the silica gel or silica-zirconia gel is characterized on a dry basis, by a pore volume of at least 0.6 cc./gram.

Considering the particulate weighting agent, where it is other than a kaolin clay the prime requirement is that it be of a material that does not react with the high porosity synthetic amorphous gel oxide to such extent as to form a compound that would cause an appreciable change in the pore volume-surface area relationship of the finished catalyst. Suitable other weighting agents include alpha alumina, zircon, mullite, alumina monohydrate, alumina trihydrate, halloysite, sand, $TiO_2$, silicon, metals such as aluminum and titanium, etc.

The mean particle size of the weighting agent which is incorporated as one component of the matrix is desirably less than about 40 microns. Preferably the particle size is from about 0.1 to 20, and most preferably from about 2 to 10 microns.

To the foregoing synthetic amorphous oxide gel-weighting agent matrix slurry there is added a slurry of crystalline aluminosilicate particles.

Suitable crystalline aluminosilicates for use in the composite catalysts of our invention are described in U.S. Pat. 3,140,249 as well as U.S. Pat. 3,140,253, both incorporated herein by reference. Representative crystalline aluminosilicates suitable for the present invention include those natural and synthetic crystalline aluminosilicates having uniform pores of a diameter preferably between about 3 and 15 angstrom units. Such crystalline aluminosilicates include zeolited Y, X, A, L, D, R, S, T, Z, E, F, Q, B, ZK–4, ZK–5, as well as naturally occurring zeolites including chabazite faujasite, sodalite, mordenite, and the like. Crystalline aluminosilicates having pore diameters between about 3 and 5 angstrom units may be suitable for size-selective conversion catalysis, while crystalline aluminosilicates having pore diameters between about 6 and 15 angstrom units are preferred for hydrocarbon conversion such as catalytic cracking and the like. Preferred crystalline aluminosilicates include synthetic faujasite or zeolites X and Y, with particular preference being accorded zeolite Y.

The crystalline aluminosilicate particles employed as a component in the catalyst compositions of the present invention are essentially characterized by a high catalytic activity.

This high catalytic activity may be imparted to the particles by base exchanging alkali metal aluminosilicate particles—either before or after dispersion thereof in the matrix—with a base-exchange solution containing ions selected from the group consisting of cations of elements of Groups I–B–VIII of the Periodic Table, hydrogen, and hydrogen precursors, including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Pats. 3,140,249 and 3,140,253.

It is particularly pointed out that the crystalline aluminosilicate component, being of high catalytic activity in the final composite, may be relatively less active upon dispersion into the matrix material. The resulting composite (obtained from incorporation of the crystalline aluminosilicate into the matrix) may be rendered highly active by base exchange, impregnation, or the like.

Where an alkali metal aluminosilicate is employed initially, it is essential to base exchange either the aluminosilicate particles before or after compositing with the matrix to reduce the sodium content of the final product to less than about 4% by weight and preferably less than 1% by weight. The sodium content of the final composite is essentially less than 4% by weight. Such compositions provide high catalytic activity when zeolite Y is the crystalline aluminosilicate component. Preferably, however, and particularly when zeolite X is the crystalline aluminosilicate component, the sodium content of the final composite should be less than 1% by weight.

As previously discussed, base exchange may be accomplished by one or more contacts (before and/or after incorporation of the crystalline aluminosilicate into the matrix) with a solution containing ions selected from the group consisting of cations of the elements of Groups I–B–VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium, preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto.

Water is the preferred solvent for the cationic salt, e.g., rare earth metal salt, for reasons of economy and ease of preparation in large scale operations involving continuous or batchwise treatment. Similarly, for this reason, organic solvents are less preferred but can be employed providing the solvent permits ionization of the cationic salt. Typical solvents include cyclic and acyclic ethers such as dioxane, terahydrofuran, ethyl ether, diethyl ether, diisopropyl ether, and the like; ketones, such as acetone and methyl ethyl ketone; esters such as ethyl acetate; alcohols such as ethanol, propanol, butanol, etc.; and miscellaneous solvents such as dimethylformamide, and the like.

In carrying out the treatment with the fluid medium, the procedure employed varies depending upon the particular aluminosilicate which is treated. If the aluminosilicate which is treated has alkali metal cations associated therewith, then the treatment with the fluid medium or media sould be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium is substantially free of alkali metal cations, i.e., a calcium aluminosilicate, then the treatment need not be carried out until such time as the metal is exhausted since the presence of metals other than alkali metals does not seriously limit catalytic properties. Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous or monaqueous solution may be passed slowly through a fixed bed of aluminosilicate. If desired, hydrothermal treatment or corresponding nonaqueous treatment with polar solvents may be effected by introducing the aluminosilicate and fluid medium into a closed vessel maintained under autogeneous pressure. Similarly, treatments involving fusion or vapor phase contact may be employed.

Where a rare earth zeolite is desired, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinum as well as mixtures of rare earth cations containing a predominant amount of one or more of the above cations are preferred since these metals provide optimum activity for hydrocarbon conversion, including catalytic cracking.

Aluminosilicates which are treated with a fluid medium or media in the manner above described include a wide variety of aluminosilicates both natural and synthetic which have a crystalline or combination of crystalline and amorphous structure.

The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

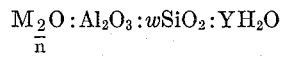

wherein M represents at least one cation which balances the electrovalence of the tetrahedra, $n$ represents the valence of the cation, $w$ the moles of $SiO_2$ and Y the moles of $H_2O$. The cation can be any or more of a number of metal ions, depending upon whether the aluminosilicate is synthesied or occurs naturally. Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and, as noted, include synthesized aluminosilicates, natural aluminosilicates, and certain caustic treated clays. Among the aluminosilicates are included zeolites A, Y, L, D, R, S, T, Z, E, F, Q, B, X, levynite, dachiarite, erionite, faujasite, analcite, paulingite, noselite, phillipsite, brewsterite, flakite, datalite, chabazite, gmelinite, leucite, scapolite, mordenite as well as certain caustic treated clays such as montmorillonite and kaolin families. The preferred aluminosilicates are those having pore diameters of at least about 4 angstroms.

Particularly preferred rare earth zeolites for use in this invention may be made by base exchange of sodium zeolite X with rare earth ions to form rare earth zeolite X (see, e.g., Plank et al. U.S. Pat. 3,140,249, Example 26), and by base exchange of sodium zeolite Y with rare earth ions to form rare earth zeolite Y (see, e.g., Plank et al. application Ser. No. 195,945, filed May 18, 1962, entitled "Catalyst and Conversion of Organic Compounds in the Presence Thereof").

In no instance should there be any more than 0.25 equivalent per gram atom of aluminum of alkali metal associated with the aluminosilicate.

Within the above limits it is preferred that there be a minimum amount of alkali metal cations associated therewith since, as noted, the presence of these metals tends to suppress or limit catalytic properties, the activity of which, as a general rule, decreases with increasing content of alkali metal cations. It is also preferred that the novel compositions have at least 0.4 and more desirably 0.6 to 1.0 equivalent per gram atom of aluminum of positive ions of which at least some are rare earth metal cations. Additionally, in those situations wherein the catalyst composition contains metallic cations other than rare earth metal cations, it is then prefered that they be at least divalent with the cations of divalent metals, such as calcium, magnesium, and manganese being particularly advantageous. Polyvalent metalic ions capable of reduction to lower valence states are also particularly advantageous for dual function catalysts.

A more preferred embodiment of this invention uses rare earth zeolite compositions which have from 0.5 to 1.0 equivalent per gram atom of aluminum of rare earth metal cations. Thus, in the most preferred embodiment of this invention, rare earth metal cations are substantially the only metallic cations associated with the aluminosilicate.

It appears that the rare earth cations tend to impart stability to the aluminosilicate compositions, thereby rendering them far more useful for catalytic purposes, particularly in hydrocarbon conversion processes such as cracking.

The incorporation of the rare earth cations into the zeolite by base-exchange is advantageously effected before the zeolite particles are brought into contact with the matrix.

After the rare earth zeolite is blended with the matrix and dried, the resulting composite is advantageously given a wet treatment to remove the residual alkali-metal ions (which may, for example, be present, at this stage in amount of about 1 to 5%, and more usually from about 1 to 3%, based on the zeolite), by further base exchange with materials capable of providing hydrogen ions.

The efficiency of this subsequent treatment is greatly improved if the rare earth zeolite, in finely divided condition, is pretempered by subjecting it to dehydrating conditions, as by calcination, to lower its residual moisture content to a value within the range of 0.3 to 6%, more preferably within the range of 1.5 to 6%, such pretempering being effected before the rare earth zeolite is brought into contact with the matrix. As a result of this pretempering the rare earth zeolite can be later exchanged to a lower sodium content much more easily, it becomes more resistant to loss of crystallinity on contact with acidic media and the relative crystallinity of the final product is higher. In addition the rare earth component becomes more fixed in the crystalline aluminosilicate and more resistant to removal on subsequent base exchanges.

Suitable pretempering conditions are, for example, a temperature of about 650° F. in air for about 60 minutes or a temperature of about 1500° F. in air for about 10 minutes, or a treatment with superheated steam at about 1100–1200° F. at 15 p.s.i.g. for from about 10 to 60 minutes; a preferred treatment is at atmospheric pressure at a temperature of about 1050–1250° F. in steam, air, or a steam-air mixture for from about 10 to 60 minutes. (This pretempering technique is described more fully in U.S. application Ser. No. 459,687, filed May 28, 1965, entitled "Improved Crystalline Zeolites and Method of Preparing Same.")

The mean particle size of the crystalline aluminosilicate incorporated into the matrix is advantageously less than about 40 microns. Preferably the particle size is in the range of about 0.1 to 20 microns, and most preferably from about 2 to 10.

The fine particles of crystalline aluminosilicate are conveniently slurried in a liquid medium, preferably an aqueous liquid, before adding them to the matrix. Where the crystalline aluminosilicate is a rare earth zeolite, particularly good results are obtained when the liquid medium contains a dissolved rare earth salt such as a rare earth chloride, sulfate, nitrate or the like, with preference being accorded rare earth chlorides.

The presence of the dissolved rare earth salt increases the resistance to loss of activity at the low pH of the matrix on which the zeolite is being deposited (which loss possibly results in part from loss of rare earth from the zeolite). In addition the crystallinity of the finished catalyst is higher when the dissolved rare earth salt is present in the slurry, even when compared to a catalyst made in a similar manner except that the dissolved rare earth salt is omitted from the slurry and is instead applied to the rare earth zeolite-matrix after spray drying and the wet treatment to remove residual alkali metal.

The matrix into which the crystalline aluminosilicate is dispersed is prepared in such a manner that, as charged to the cracking unit, the synthetic amorphous oxide gel (silica gel or silica-zirconia gel) has a pore volume of at least about 0.6 cc./g., and generally from about 0.6 to 1.5 cc./g. A preferred pore volume range is from about 0.8 to 1.3 cc./g., with the most preferred range being from about 1 to 1.2 cc./g.

Increase in pore size increases the effective diffusivity of the resulting catalyst. Also the increase in pore size gives a material which is a more effective cracking catalyst, particularly with heavy gas oils which generally produce relatively large amounts of coke (e.g., oils having a boiling point range of from about 650 to 1050° F.) and wide cut gas oils having a boiling point range of from about 400 to 1000° F. Catalysts made with the large pore size matrices also have longer effective lives and are more resistant to sintering and resistant to decrease in their effective diffusivity with continued use.

The porosity of the matrix can be adjusted so as to obtain the desired pore volume. Thus, increased porosity may be obtained by increasing the time and temperature of aging of the silica gel, aging at a pH of 7 to 10, etc. For a more detailed discussion of such prior art techniques for adjusting porosity, see "Control of Physical Structure of Silica-Alumina Catalyst" by Ashley et al., vol. 44, Industrial and Engineering Chemistry, at pages 2861–2863 (December 1952).

The concentration of the matrix in the slurry may be, for example, in the range of about 1 to 15%. As stated previously, the crystalline aluminosilicate is also preferably in slurry form. Its concentration in its slurry may, for example, be in the range of about 1 to 40%. Where a rare earth zeolite is employed, a dissolved rare earth salt is advantageously present in an amount, expressed as rare earth chloride hexahydrate ($RECl_3 \cdot 6H_2O$), of from about 0.1 to 5 weight percent of the matrix, and preferably from about 0.333 to 1.0 weight percent of the matrix.

Advantageously, the amount of crystalline zeolite in the slurry is sufficient to provide a concentration of this component, in the finished catalyst, in the range of about 1 to 80 percent by weight, preferably about 2 to 20 weight percent, and most preferably from about 5 to 10 weight percent.

The particles of crystalline aluminosilicate zeolite are dispersed in the matrix, preferably by a thorough mixing of the slurry of crystalline zeolite with the slurry of matrix, as by pumps and paddles. It is then desirable to filter the blend. Filtration increases the total solids concentration of the blend to over 8%, e.g., typically from about 10 to 12%, and also removes dissolved salts.

The filtered material is then subdivided and dried to form the desired particles. A particularly good method of making microspherical particles (e.g., of particle size of about 1 to 200 microns, the bulk of which are in the range of about 40 to 90 microns) especially suitable for use in fluidized catalytic cracking, is spray drying, preferably under high pressures, e.g., of the order of from about 200 to 2000 p.s.i.g., and preferably from about 1000 to 1500 p.s.i.g.

The spray drying temperature is ordinarily within the range of 200° F. to 1000° F. The temperature used will depend upon such factors as the quantity of material to be dried and the quantity of air used in the drying. The evaporation rate will vary depending on the quantity of air used in the drying. The temperature of the particles which are being dried is preferably within the range of 150° F. to 300° F. at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-counter current drying.

After the dried particles have been formed they are preferably given a wet treatment to further remove alkali metal. One suitable technique for this purpose is to treat the particles with a solution of ammonium sulfate, e.g., with water containing about 1–10%, preferably about 2–5%, of ammonium sulfate to remove sodium ions, and then to wash the particles with water. A series of alternating ammonium sulfate and water treatments may be used, ending with a wash with ammonia water (e.g., at a pH of 7–8.5) to remove sulfate ions. The particles are then dried in any suitable manner, as by air drying at 250° F.

By virtue of the foregoing wet treatment of the dried particles, e.g., with aqueous ammonium sulfate, to further remove alkali metal from the zeolite and matrix, ammonium ions are introduced. Upon subsequent drying, ammonia is liberated leaving hydrogen ions, so that the zeolite may contain cations such as rare earth metal cations and also hydrogen ions, thus resulting in a catalyst having highly desirable characteristics.

The finished catalyst is characterized by a residual sodium content not in excess of about 0.2 weight percent, expressed as $Na_2O$, based upon the weight of the dried catalyst. Indeed, a catalyst having a residual sodium content not in excess of about 0.1 weight percent $Na_2O$ may readily be attained, and where the dispersed rare earth zeolite is of the X form (as contrasted to rare earth zeolite Y) the residual sodium level is preferred to be not in excess of about 0.05 weight percent $Na_2O$.

As pointed out previously, it is highly advantageous that the synthetic amorphous oxide gel component (silica gel or silica-zirconia gel) of the matrix be such that, if utilized alone, it would be characterized by substantially no catalytic activity, i.e., have an alpha ($\alpha$) value of less than 0.1, and preferably less than 0.05.

The term "alpha" is well recognized in the art as designating relative catalytic activity. See, in particular, the definition of alpha by P. B. Weisz and J. N. Miale appearing in the Journal of Catalysis, vol. 4, No. 4 (August 1965) at pages 525–529. In the present application reference to "alpha" and to tests for determining alpha values is as defined in the foregoing Weisz and Miale article.

Crystalline aluminosilicate components have been found to have alphas in the range of between about 0.5 to substantially greater than 10,000. Conventional cracking catalysts and other amorphous materials have exhibited alphas generally in the range of about 0.1 to 2.0. By way of contrast, the synthetic amorphous oxide gel component (silica gel or silica-zirconia gel) of our composite catalyst is desirably characterized (based on its use alone) by an alpha ($\alpha$) value of less than 0.1, and preferably by an alpha value of less than about 0.05.

The catalysts of this invention can, by a relatively mild heat treatment, be put in a highly active condition in which they are suitable for direct use in fluid catalytic cracking and in which they exhibit the desired selectivity for producing gasolines, mainly at the expense of the undesirable products of cracking, e.g., dry gas and coke. This heat treatment can take place during regular cracking-regeneration cycles. Thus, when the catalysts are added, as makeup, in an operating fluid catalytic cracking installation they will soon attain their desired selectivity after a few cracking-regeneration cycles, without the need of a preliminary steam activating step. Alternatively, the catalysts may be given a preliminary heat treatment in air (and in fluidized condition) at a temperature of 1100–1400° F. for from about 3 to 16 hours.

We have found that the unusually high pore volume of the synthetic amorphous oxide gel (silica or silica-zirconia) in the matrix results in an overall composite whose physical characteristics, e.g., pore volume, surface area, density, are virtually unaltered upon subjecting the composite to thermal treatment for extended periods, even at temperatures of the order of 1700° F. and higher. Be contrast, similar composites, but wherein the matrix is silica-alumina (alumina precipitated onto previously formed silica), show marked variation in the foregoing properties when subjected to such thermal treatment.

As will be demonstrated in certain of the subsequent examples, it appears that the unique stability of our composite catalysts contributes to their superior catalytic performance.

We have also found that the use of composite catalysts wherein a crystalline aluminosilicate zeolite is dispersed in a matrix of silica, zirconia, and weighting agent (desirably clay) affords certain further advantages. Specifically, such catalysts exhibit superior thermal stability, as shown by their behavior after mild and severe thermal treatments. In addition, such catalysts are more easily prepared and handled in commercial operation, as shown by ease of filtration prior to spray drying with the consequent formation of a more compact filter cake and hence, a final fluid product of superior quality and performance. See, e.g., the last examples herein.

It is also to be noted that, according to one aspect of our invention, there is provided a matrix material that is highly advantageous for use in composite catalysts generally. This matrix comprises or is made up of (1) from about 20 to 95% by weight of porous silica gel or silica-zirconia gel, the gel having a pore volume of at least about 0.6 cc. per gram and an alpha ($\alpha$) of less than 0.1 and (2) from about 5 to 80% by weight of a weighting agent, preferably clay. Preferably, the ranges are from about 50 to 70% inorganic oxide gel (silica or silica-zirconia gel) and 30 to 50% clay, and the inorganic oxide gel has an alpha of less than 0.05 and a pore volume of from about 0.6 to 1.5 cc. per gram. A more preferred pore volume for the inorganic oxide gel is from about 0.8 to 1.3 cc. per gram, with a pore volume of from about 1 to 1.2 cc. per gram being most preferred.

Where zirconia is to be present as a component of the matrix, it is desirable that the zirconia level of the synthetic inorganic oxide gel (silica gel-zirconia gel) be from about 0.5 to 25% by weight on a dry basis. A more preferred range is from about 1 to 10%, with the most preferred range being from about 2 to 5%. As previously pointed out, the desired zirconia level is readily obtained by appropriate selection of concentration and/or amount.

The foregoing inorganic oxide gel-clay material affords unusual advantages when used as a matrix for a more active catalytic component. For example, where such more active catalytic component exhibits catalytic cracking activity, the overall composite catalyst shows highly desirable selectivity in that it produces as much or more gasoline with relatively less coking than a similar composite but wherein the matrix is one heretofore known and used in the art. Naturally, this ability to catalytically crack to desired fractions with relatively less coke formation is highly desirable, e.g., there is less load on the regenerator, "dirtier" feed stocks may be employed, etc. And such relatively superior results are attributable, in part if not in whole, to the unique properties of our silica-clay matrix.

Our invention also provides a method for forming the foregoing inorganic oxide gel-clay matrix. This method is essentially that described in detail previously in connection with the preparation of our composite catalyst. The difference is, however, that after acid has been added to reduce the pH to from about 4 to 7, and preferably from about 4.0 to 5.0, thereby forming the inorganic oxide gel-clay matrix slurry, the subsequent step of admixing therewith a slurry of crystalline aluminosilicate particles is omitted. The remainder of the process remains as previously described. Thus, in brief, the inorganic oxide gel-clay matrix slurry is filtered, spray dried, the spray dried material is subjected to ion exchange, as by treating with aqueous ammonium sulfate solution, then is water washed free of sulfate ion, and this is followed by drying, as by flash drying.

Reference hereinafter will be made to "Heavy Mid-Continent Gas Oil" and/or "Wide Cut Mid-Continent Gas Oil." These oils are more particularly identified in the accompanying table.

TABLE.—PROPERTIES OF MID-CONTINENT GAS OILS

|  | HMCGO | WCMCGO |
| --- | --- | --- |
| API gravity | 23.9 | 29.4 |
| Sp. grav., 60/60° F | 0.9106 | 0.8794 |
| Aniline point, ° F | 196.5 | 177.5 |
| Pour point, ° F |  | 85 |
| Conradson carbon residue, percent wt | 1.83 | 0.13 |
| Ramsbottom carbon residue, percent wt |  | 0.16 |
| Sulfur, percent wt | 0.39 | 0.54 |
| Total nitrogen, percent wt | 0.14 | 0.069 |
| Basic nitrogen, percent wt |  | 0.0251 |
| K.V. at 100° F | 245.9 |  |
| K.V. at 210° F | 9.23 |  |
| Molecular weight | 408 | 315 |
| Refractive index at 70° C | 1.486 | 1.47067 |
| Density by pycnometer, 70° C., gms./cc | 0.8757 |  |
| Hydrocarbon type analysis: aromatics, percent | 43.6 | 32.7 |
| Distillation: |  |  |
| IBP | 425 | 411 |
| 5 | 604 | 555 |
| 10 | 691 | 580 |
| 20 | 762 | 610 |
| 30 | 807 | 640 |
| 40 | 835 | 671 |
| 50 | 865 | 709 |
| 60 | 895 | 757 |
| 70 | 925 | 794 |
| 80 | 967 | 835 |
| 90 | 1,016 | 895 |
| 95 | 1,022 | 915 |
| Volumetric avg. boiling pt | 861 | 654 |
| Mean avg. boiling pt | 841 | 644 |
| UOP K factor | 11.94 | 11.78 |

The following examples will further illustrate our invention. All parts are by weight unless otherwise stated.

EXAMPLE 1

5% rare earth zeolite Y (REY) in a silica-clay matrix (60% $SiO_2$, 40% Clay)

1860 grams of Georgia kaolin were added to 49,940 grams of deionized water and the whole was mixed thoroughly. 8360 grams of Q-brand, sodium silicate [containing 8.9% wt. $Na_2O$ and 28.7% wt. $SiO_2$] were added to the water-clay slurry. The sodium silicate was added slowly over a period of 30 minutes while mixing. The clay was uniformly dispersed and coated with sodium silicate. The whole was heated to 120° F. and then 432 grams (234 cc.) of concentrated sulfuric acid (95.3% wt. $H_2SO_4$) were added while mixing, to thereby reduce the pH to 10.1. The temperature was raised to 140° F. and held there for 2 hours. While agitating, 735 grams (400 cc.) of concentrated sulfuric acid were added to lower the pH to from about 4.5 to 5.0. 216 grams REY (68% exchanged; i.e., 68% of the sodium content had been replaced with rare earth cations), which previously had been calcined at about 1200° F. for about ten minutes, were slurried in a rare earth chloride solution prepared from 64 grams $RECl_3 \cdot 6H_2O$ and 600 cc. of deionized water. (The REY had the following composition: $Al_2O_3$=19.9%; $SiO_2$=60.3%; $(RE)_2O_3$=15.5%; $Na_2O$=4.3%.) This slurry was added to the foregoing silica-clay slurry while mixing. The blend was homogenized and then filtered. The filter cake was spray dried (inlet gas to spray dried about 800° F. and outlet gases about 300–325° F.) to produce microspheres from about 1 to 140 microns in diameter, with an average particle size of about 62 microns.

The spray dried particles were then treated with 20 gallons of 5% aqueous solution of ammonium sulfate at 90° F. to remove sodium, then washed with water at 90° F. until effluent was free of sulfate ions. The product was then air dried at 250° F.

The overall composite (5% REY in a 60% $SiO_2$, 40% clay matrix) analyzed as follows:

|  | Wt. percent |
| --- | --- |
| $SiO_2$ | 80.6 |
| $Al_2O_3$ | 18.6 |
| $(RE)_2O_3$ | 0.7 |
| $Na_2O$ | 0.08 |
| Total | 99.98 |

After heating the composite for 3 hours at 1200° F. in essentially dry air, the following properties were obtained:

Packed density of composite—0.44–0.45 gram/cc.
Pore volume of silica gel—1.33 cc./gram
Alpha ($\alpha$) of silica gel—<0.04
Alpha ($\alpha$) of silica-clay—<0.04

EXAMPLE 2

5% REY in a silica-alumina matrix (87% $SiO_2$, 13% $Al_2O_3$)

This example served as a "control" and was similar to Example 1, except that a silica-alumina matrix was employed rather than a silica-clay matrix. alumina salt as to provide 13% alumina and 87% silica alumina matrix, having a pH of 5 and a temperature of 110° F., was prepared in accordance with the procedure set forth in U.S. Pat. 2,941,961, using such proportions of alumina salt as to provide 13% alumina and 87% silica in a matrix having a pore volume of 0.90 cc./g.

A slurry of REY in rare earth chloride solution was prepared as described in Example 1. This slurry was then added to the foregoing silica-alumina slurry and thereafter the procedure was the same as that described in Example 1. There resulted a composite wherein 5% of REY was dispersed in an 87% silica-13% alumina matrix. This composite analyzed as follows:

|  | Wt. percent |
| --- | --- |
| $SiO_2$ | 84.90 |
| $Al_2O_3$ | 13.80 |
| $(RE)_2O_3$ | 0.90 |
| $Na_2O$ | 0.04 |
| Total | 99.64 |

After heating the composite for 3 hours at 1200° F. in essentially dry air, the following properties were obtained:

Packed density of composite—0.46 gram/cc.
Alpha ($\alpha$) of silica-alumina—0.5

EXAMPLE 3

In order to evaluate the heat stability of the products of Examples 1 and 2, samples of each such product were heated for 3 hours at various temperatures. Thus, one pair of samples was heated for three hours at 1200° F., another pair at 1650° F., and another pair at 1725° F. Pore volume, surface area, and packed density for each sample were then ascertained.

The results are shown in FIG. 1. It will be noted that the pore volume, surface area, and density remained essentially constant for the product of Example 1 (REY in a silica-clay matrix). This was not the case for the product of Example 2 (REY in a silica-alumina matrix). Thus, as the temperature of heat treatment increased, pore volume and surface area decreased and density increased. This decrease in pore volume and surface area, which is believed to result from interaction between the silica and alumina in the matrix, is also reflected in catalytic performance, as shown hereinafter.

EXAMPLE 4

The products of Examples 1 and 2 were tested for catalytic performance in cracking Wide Cut Mid-Continent Gas Oil, both after thermal treatment in air and after thermal treatment in steam. The conditions and results are set out in Table 1.

TABLE 1.—COMPARISON OF CATALYSTS OF EXAMPLES 1 AND 2

| | Bench FCC test—WCMCGO, 925° F., 5 WHSV, 5 C/O | | | | | | Physical properties | | |
|---|---|---|---|---|---|---|---|---|---|
| | Conversion, volume percent | C₅+ gasoline, volume percent | Total C₄'s, volume percent | Dry gas, wt. percent | Coke, wt. percent | Gasoline octane No. R+3 | Pore volume, cc./gm. | Packed density, gm./cc. | Surface area, m.²/gm. |
| Catalyst conditioning: | | | | | | | | | |
| Thermal: | | | | | | | | | |
| 3 hrs./1,200° F./air: | | | | | | | | | |
| Catalyst of Ex. 1 | 72.5 | 53.7 | 17.4 | 8.2 | 5.6 | 97.5 | 0.80 | 0.44 | 267 |
| Catalyst of Ex. 2 | 84.0 | 52.2 | 24.8 | 11.2 | 10.4 | | 0.89 | 0.46 | 442 |
| 3 hrs./1,650° F./air: | | | | | | | | | |
| Ex. 1 | 74.3 | 55.4 | 17.4 | 8.1 | 6.3 | 97.6 | 0.77 | 0.46 | 273 |
| Ex. 2 | 83.4 | 55.6 | 21.6 | 10.3 | 10.0 | 97.0 | 0.71 | 0.56 | 302 |
| 3 hrs./1,725° F./air: | | | | | | | | | |
| Ex. 1 | 68.6 | 52.7 | 14.6 | 7.4 | 4.5 | 97.1 | 0.77 | 0.47 | 255 |
| Ex. 2 | 77.4 | 54.1 | 19.6 | 8.9 | 7.5 | 96.8 | 0.43 | 0.70 | 214 |
| Steam: | | | | | | | | | |
| 4 hrs./1,400° F./0 p.s.i.g.: | | | | | | | | | |
| Ex. 1 | 67.0 | 57.0 | 12.2 | 5.6 | 2.1 | 94.6 | 0.77 | 0.45 | 228 |
| Ex. 2 | 72.6 | 58.3 | 16.2 | 7.0 | 3.1 | 95.8 | 0.68 | 0.54 | 199 |
| 5 hrs./1,400° F./15 p.s.i.g.: | | | | | | | | | |
| Ex. 1 | 58.4 | 49.8 | 10.3 | 5.0 | 2.1 | 95.4 | 0.74 | 0.54 | 184 |
| Ex. 2 | 59.7 | 50.5 | 10.6 | 5.1 | 2.3 | 95.6 | 0.62 | 0.58 | 127 |

The superior product distribution (high gasoline, low coke) obtained using the catalyst of Example 1 as compared to that for the catalyst of Example 2 is readily apparent. Note too that the gasoline yields for these two catalysts are virtually the same (after any given thermal tretament), yet the percent conversion required to achieve such gasoline yield is invariably lower for the catalyst of Example 1 than for the catalyst of Example 2.

EXAMPLE 5

The products of Examples 1 and 2 were also evaluated for catalytic performance in cracking Heavy Mid-Continent Gas Oil. The conditions and results are set out in Table 2.

TABLE 2.—PERFORMANCE OF THE CATALYSTS OF EXAMPLES 1 AND 2 WITH HEAVY MID-CONTINENT GAS OIL

| | Catalyst of Example 1 | | | | | | Catalyst of Example 2 | | | |
|---|---|---|---|---|---|---|---|---|---|---|
| | Steamed, 4 hrs./1,400° F./0 p.s.i.g. | | | | | Steamed, 5 hrs./1,400° F./ 15 p.s.i.g. | Steamed, 4 hrs./1,400° F./ 0 p.s.i.g. | Steamed, 5 hrs./1,400° F./ 15 p.s.i.g. | Steamed, 14 hrs./1,400° F./20 p.s.i.g. |
| Bench FCC test—HMCGO, 925° F., 5 C/O, 5 WHSV: | | | | | | | | | | |
| Conversion, vol. percent | 68.3 | 66.3 | 62.7 | 65.8 | 62.2 | 69.5 | 58.9 | 57.6 | 74.3 75.9 76.2 | 59.7 62.9 | 62.6 |
| C₅+ gasoline, vol. percent | 59.2 | 58.2 | 55.2 | 58.9 | 56.0 | 60.0 | 52.1 | 50.7 | 61.0 62.8 62.1 | 50.3 52.0 | 53.0 |
| Total C₄'s, vol. percent | 10.6 | 12.0 | 10.7 | 10.7 | 9.6 | 13.5 | 9.6 | 10.2 | 17.8 16.9 17.3 | 12.1 12.2 | 11.2 |
| Dry gas, wt. percent | 7.1 | 5.9 | 4.8 | 4.9 | 4.7 | 6.1 | 5.0 | 5.4 | 7.4 7.5 7.8 | 5.4 5.6 | 5.7 |
| Coke, wt. percent | 4.0 | 3.7 | 3.3 | 2.8 | 3.2 | 3.2 | 3.2 | 2.8 | 5.1 4.5 4.5 | 4.0 5.6 | 4.5 |
| C₅+ gasoline octane number, R+3 | 95.3 | 95.9 | 96.0 | 95.6 | 95.7 | 95.7 | 96.5 | 97.0 | | | |

If one compares the performance at approximately the same percent conversion, it is apparent that the catalyst of Example 1 has superior selectivity to that of Example 2, viz, about a 3% higher gasoline yield and a reduced coke yield. For instance, at a conversion of 62.7% the catalyst of Example 1 gives 55.2% gasoline and only 3.3% coke, whereas at a conversion of 62.9% the catalyst of Example 2 gives only 52.0% gasoline and 5.6% coke.

FIG. 2 summarizes in graphical form the data set out in Table 2. The superior performance for the catalyst of Example 1 (higher gas yield and lower coke at a given conversion) is manifest.

This ability of the catalysts of our invention to produce proportionately less coke is of particular value when dealing with "dirty" feedstocks, e.g., heavy gas oils that ordinarily tend toward high coke formation, with consequent tendency to deactivate the catalyst.

It is to be noted that the catalytic composites of the present invention exhibit superior catalytic performance, not only as compared to similar composite catalysts wherein the matrix is silica-alumina, e.g., Example 2, but also as compared to similar composite catalysts wherein the matrix consists of silica and contains no clay (or other weighting agent).

As shown by the previous examples, the catalyst compositions of the present invention are most suitable for conversion of hydrocarbons, particularly for the catalytic cracking of petroleum stocks.

EXAMPLE 6

7% rare earth zeolite Y (REY) in a silica-clay matrix (60% SiO₂, 40% clay)

2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds of SiO₂) were added to the water-clay slurry. The sodium silicate was added slowly over a period of 30 minutes while mixing. The clay was uniformly dispersed and coated with sodium silicate. The whole was heated to 120° F. and then aqueous sulfuric acid (35 wt. percent H₂SO₄) was added while mixing, in such quantity as to reduce the pH to 9.8. The temperature was raised to 140° F. and held there for 1 hour. While agitating, additional aqueous sulfuric acid (35 wt. percent H₂SO₄) was added to lower the pH to from about 4.0 to 4.5. The whole was kept at this pH for about one hour. 400 pounds of REY (68% exchanged; i.e., 68% of the sodium content had been replaced with rare earth cations), which previously had been calcined at about 1200° F. for about ten minutes, were slurried in a rare earth chloride solution prepared from 128 pounds of $$RECl_3 \cdot 6H_2O$$

and 250 gallons of deionized water. (The REY had the following composition: Al₂O₃=15.5%; Na₂O=4.3%.) This slurry was added to the foregoing silica-clay slurry while mixing. The blend was homogenized and then filtered. The filter cake was spray dried at 1000-1500 p.s.i.g. (inlet gas to spray drier about 800° F. and outlet gases about 300-325° F.) to produce microspheres of from about 1 to 140 microns in diameter, with an average particle size of about 62 microns.

The spray dried particles were then treated on a filter with a 2% aqueous solution of ammonium sulfate at about 110° F.–120° F. to remove sodium. Two such treatments were employed, each using 3500 pounds of 2% aqueous ammonium sulfate solution. Thereafter the particles were washed with water at 90° F. until effluent was free of sulfate ions. The product was then flash dried at about 212 to 215° F.

The overall composite (7% REY in a 60% $SiO_2$, 40% clay matrix) analyzed as follows:

| | Wt. percent |
|---|---|
| $SiO_2$ | 81.9 |
| $Al_2O_3$ | 16.8 |
| $(RE)_2O_3$ | 1.2 |
| $Na_2O$ | 0.08 |
| Total | 99.98 |

EXAMPLE 7

7% rare earth zeolite Y (REY) in a silica-zirconia clay matrix (58% $SiO_2$, 2% $ZrO_2$, 40% clay)

2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds $SiO_2$) were added to the water-clay slurry. The sodium silicate was added slowly over a period of thirty minutes while mixing. The clay was uniformly dispersed and coated with sodium silicate. The whole was heated to 120° F. and then sufficient aqueous sulfuric acid (35% wt. $H_2SO_4$) was added while mixing to reduce the pH to 9.8. The temperature was raised to 140° F. and held there for one hour. 330 pounds of zirconium sulfate (as $ZrSO_4 \cdot 4H_2O$) in 250 gallons of deionized water were slowly added. While agitating, additional aqueous sulfuric acid (35 wt. percent $H_2SO_4$) was added to lower the pH to from about 4.0 to 4.5. The whole was kept at this pH for about one hour. 400 pounds of REY (68% exchanged; i.e., 68% of the sodium content had been replaced with rare earth cations), which previously had been calcined at about 1200° F. for about ten minutes, were slurried in a rare earth chloride solution prepared from 128 pounds $RECl_3 \cdot 6H_2O$ and 250 gallons of deionized water. (The REY had the following composition $Al_2O_3$=19.9%; $SiO_2$=60.3%; $(RE)_2O_3$=15.5%; $Na_2O$=4.3%.) This slurry was added to the foregoing silica-zirconia-clay slurry while mixing. The blend was homogenized and then filtered. The filter cake was spray dried at 1000–1500 p.s.i.g. (inlet gas to spray drier about 800° F. and outlet gases about 300–325° F.) to produce microspheres of from about 1 to 140 microns in diameter, with an average particle size of about 62 microns.

The spray dried particles were then treated on a filter with a 2% aqueous solution of ammonium sulfate at about 110° F.–120° F. to remove sodium. Two such treatments were employed, each using 3500 pounds of 2% aqueous ammonium sulfate solution. Thereafter the particles were washed with water at 90° F. until effluent was free of sulfate ions. The product was then flash dried at about 212 to 215° F.

The overall composite (7% REY in a 58% $SiO_2$, 2% $ZrO_2$, 40% clay matrix) analyzed as follows:

| | Wt. Percent |
|---|---|
| $SiO_2$ | 79.9 |
| $Al_2O_3$ | 16.8 |
| $ZrO_2$ | 2.0 |
| $(RE)_2O_3$ | 1.2 |
| $Na_2O$ | 0.08 |
| Total | 99.98 |

For the composites of each of Examples 6 and 7, the following properties were obtained:

| Property | Composite of— | |
|---|---|---|
| | Example 6 | Example 7 |
| Packed density of composite, g./cc. | 0.60 | 0.57 |
| Pore volume of inorganic oxide gel, cc./g. | [1] 1.05 | [2] 1.00 |
| Surface area, m.²/g. | 393 | 372 |
| Alpha ($\alpha$) of inorganic oxide | [1] <0.04 | [2] <0.04 |

[1] Silica gel.
[2] Silica-zirconia gel.

The composite products of Examples 6 and 7 were tested for catalytic performance in cracking Wide-Cut Mid-Continent Gas Oil (1) after thermal treatment in air at 1725° F. for three hours, (2) after thermal treatment in steam at 1400° F. and zero p.s.i.g. for four hours, and (3) after thermal treatment in steam at 1400° F. and 15 p.s.i.g. for five hours. The conditions and results are set out in Table 3.

TABLE 3.—COMPARISON OF CATALYSTS OF EXAMPLES 6 AND 7

| | Bench FCC test—WCMCGO, 925° F., 5 WHSV, 5 C/O | | | | | Physical properties | | |
|---|---|---|---|---|---|---|---|---|
| | Conv., vol. percent | $C_5+$ gasoline, vol. percent | Total $C_4$'s, vol. percent | Dry gas, wt. percent | Coke, wt. percent | Pore volume, cc./gm. | Packed density, gm./cc. | Surface area, m.²/gm. |
| Catalyst conditioning: | | | | | | | | |
| Thermal: | | | | | | | | |
| 3 hrs./1,725° F./air: | | | | | | | | |
| Catalyst of Ex. 6 | 51.1 | 43.1 | 9.2 | 4.9 | 2.4 | 0.50 | 0.69 | 284 |
| Catalyst of Ex. 7 | 54.6 | 44.8 | 11.0 | 5.2 | 2.6 | 0.48 | 0.69 | 259 |
| Steam: | | | | | | | | |
| 4 hrs./1,400° F./0 p.s.i.g.: | | | | | | | | |
| Ex. 6 | 52.8 | 46.4 | 8.8 | 4.1 | 1.6 | 0.51 | 0.66 | 197 |
| Ex. 7 | 62.1 | 53.6 | 11.4 | 5.1 | 2.1 | 0.53 | 0.65 | 202 |
| 5 hrs./1,400° F./15 p.s.i.g.: | | | | | | | | |
| Ex. 6 | 35.0 | 30.3 | 4.8 | 3.4 | 1.4 | 0.48 | 0.69 | 123 |
| Ex. 7 | 43.0 | 34.0 | 11.2 | 4.3 | 1.3 | 0.50 | 0.72 | 138 |

Referring to Table 3, it will be apparent that the catalyst of Example 7, wherein a silica-zirconia-clay matrix was employed, offered superior performance as compared to the catalyst of Example 6, wherein a silica-clay matrix was utilized. Thus, in each instance the catalyst of Example 7 afforded a higher percent conversion with a corresponding improvement in yield of $C_5$'s and gasoline. Indeed, it will be noted that the more severe the thermal treatment, the greater was the increment of conversion and $C_5$'s plus gasoline yield for the catalyst of Example 7 as compared to the catalyst of Example 6.

It will, of course, be recalled that composite catalysts of our invention employing silica-weighting agent, desirably, silica-clay, as the matrix, afford distinct advantages as compared to similar composite catalysts, but wherein the matrix is silica-alumina. (See, e.g., Examples 1–4.) In addition, and as shown by a comparison of the performance of the composite catalysts of Examples 6 and 7, enhanced superiority is obtained utilizing composite catalyst wherein the matrix is of silica-zirconia-weighting agent, desirably, silica-zirconia-clay.

EXAMPLE 8

Silica-clay matrix 1860 grams of Georgia kaolin were added to 49,940 grams of deionized water and the whole was mixed thoroughly. 8360 grams of Q-brand, sodium silicate [containing 8.9% wt. $Na_2O$ and 28.7% wt. $SiO_2$] were added to the water-clay slurry. The sodium silicate was added slowly over a period of 30 minutes while mixing. The clay was uniformly dispersed and coated with sodium silicate. The whole was heated to 120° F. and then 432 grams (234 cc.) of concentrated sulfuric acid (95.3% wt. $H_2SO_4$) were added while mixing, to thereby reduce the pH to 10.1. The temperature was raised to 140° F. and held there for 2 hours. While agitating, 735 grams (400 cc.) of concentrated sulfuric acid were added to lower the pH to from about 4.5 to 5.0.

The resulting mixture was filtered. The filter cake was spray dried (inlet gas to spray drier about 800° F. and outlet gases about 300–325° F.) to produce microspheres of from about 1 to 140 microns in diameter, with an average particle size of about 62 microns.

The spray dried particles were then treated with 20 gallons of 5% aqueous solution of ammonium sulfate at 90° F. to remove sodium, then washed with water at 90° F. until effluent was free of sulfate ions. The product was then air dried at 250° F.

The approximate composition of the resulting product is as follows:

|  | Wt. percent |
|---|---|
| $SiO_2$ | 81.0 |
| $Al_2O_3$ | 18.9 |
| $Na_2O$ | 0.03 |
| Total | 99.93 |

After heating for 3 hours at 1200° F. in essentially dry air the composite possesses the following properties:

Pore volume of silica gel—1.33 cc./gram
Alpha ($\alpha$) of silica-gel—<0.04
Alpha ($\alpha$) of silica-clay—<0.04

EXAMPLE 9

Silica-zirconia-clay matrix 2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds $SiO_2$) were added to the water-clay slurry. The sodium silicate was added slowly over a period of thirty minutes while mixing. The clay was uniformly dispersed and coated with sodium silicate. The whole was heated to 120° F. and then sufficient aqueous sulfuric acid (35% wt. $H_2SO_4$) was added while mixing to reduce the pH to 9.8. The temperature was raised to 140° F. and held there for one hour. 330 pounds of zirconium sulfate (as $ZrSO_4 \cdot 4H_2O$) in 250 gallons of deionized water were slowly added. While agitating, additional aqueous sulfuric acid (35 wt. percent $H_2SO_4$) was added to lower the pH to from about 4.0 to 4.5.

The mixture was kept at the above pH for about 1 hour and thereafter filtered. The filter cake was spray dried at 1000–1500 p.s.i.g. (inlet gas to spray drier about 800° F. and outlet gases about 300–325° F.) to produce microspheres of from about 1 to 140 microns in diameter, with an average particle size of about 62 microns.

The spray dried particles were then treated on a filter with a 2% aqueous solution of ammonium sulfate at about 100° F.–120° F. to remove sodium. Two such treatments were employed, each using 3500 pounds of 2% aqueous ammonium sulfate solution. Thereafter the particles were washed with water at 90° F. until the effluent was free of sulfate ions. The product was then dried at about 212–215° F.

The approximate composition of the resulting composite is as follows:

|  | Percent |
|---|---|
| $SiO_2$ | 80.7 |
| $Al_2O_3$ | 17.1 |
| $ZrO_2$ | 2.1 |
| $Na_2O$ | 0.05 |
| Total | 99.95 |

After heating for 3 hours at 1200° F. in essentially dry air the composite possesses the following properties:

Pore volume of silica-zirconia gel—1.00 cc./gram
Alpha ($\alpha$) of silica-zirconia gel—<0.04

EXAMPLE 10

Silica-clay matrix 2125 pounds of Georgia Kaolin were added to 54,400 pounds (6550 gallons) of deionized water and the whole was mixed thoroughly. 11,100 pounds (960 gallons) of Q-brand, sodium silicate (containing 3200 pounds of $SiO_2$) were added to the water-clay slurry. The sodium silicate was added slowly over a period of 30 minutes while mixing. The clay was uniformly dispersed and coated with sodium silicate. The whole was heated to 120° F. and then aqueous sulfuric acid (35 wt. percent $H_2SO_4$) was added while mixing, in such quantity as to reduce the pH to 9.8. The temperature was raised to 140° F. and held there for 1 hour. While agitating, additional aqueous sulfuric acid (35 wt. percent $H_2SO_4$) was added to lower the pH to from about 4.0 to 4.5. The whole was kept at this pH for about one hour.

The resulting mixture was filtered and the filter cake spray dried at 1000–1500 p.s.i.g. (inlet gas to spray drier about 800° F. and outlet gases about 300–325° F.) to produce microspheres from about 1 to about 140 microns in diameter, with an average particle size of about 62 microns.

The spray dried particles were then treated on a filter with a 2% aqueous solution of ammonium sulfate at about 100° F.–120° F. to remove sodium. Two such treatments were employed each using 3500 pounds of 2% ammonium sulfate solution. Thereafter the particles were washed with water at 90° F. until effluent was free of sulfate ions. The product was then dried at about 212 to about 215° F.

Our catalysts may also be advantageously employed for the catalytic hydrocracking of petroleum stocks, according to processes of the type commercially employed under conditions well-known to the art. The catalysts of the present invention may be combined with a hydrogenation component, either by impregnation, base exchange (preferably followed by reduction of the hydrogenation cation to the metal), admixture or the like, to form a hydrocracking catalyst of exceptional catalytic activity, selectivity and stability, and of excellent physical characteristics. Suitable hydrogenation components may be selected from the group consisting of oxides of metals, sulfides of metals and metals of Groups VI and VIII of the Periodic Table. Representative of these metals are molybdenum, cobalt, chromium, tungsten, iron, nickel, the platinum group metals, as well as combinations of these metals, their oxides or suufides. The hydrogenation component is present in the final hydrocracking composite comprising by weight between about 0.1 and 25 percent of the composite.

The catalysts of our invention are also highly suitable for the catalytic reforming of petroleum stocks, according to processes of the type commercially employed under conditions well-known to the art. The catalysts of the present invention may be combined by suitable method with a hydrogenation component, preferably platinum, comprising by weight between about 0.3 and 1.0 percent of the final reforming composite.

Our crystalline aluminosilicate composites have also been found to be excellent alkylation catalysts of exceptional activity, particularly for the alkylation of aromatics with olefins. High alkylation activity is imparted in part by calcination at particular temperatures, for example, rare earth zeolite X, at 300–600° C.; rare earth zeolite Y, at 200–400° C.; and hydrogen zeolite Y at 400–650° C. Such alkylation catalysts are also excellent for isomerization and other related conversions. Alkylation and isomerization may be effected by contact with the above catalysts under conditions well-known to the art, at temperatures below about 600° F.

While the foregoing description has been with respect to the preparation of our catalysts and matrices in fluid form, it will, of course, be apparent that they may also be embodied in other physical forms. For instance, the catalysts or the matrices may readily be employed as pellets, beads, pills, extrudates, or the like.

Variations can, of course, be made without departing from the spirit of our invention.

Having thus described our invention, what we desire to secure and hereby claim by Letters Patent is:

1. A catalyst composition comprising a particulate crystalline aluminosilicate having a sodium content of less than about 4 weight percent contained in a matrix of (1) an amorphous synthetic inorganic oxide gel selected from the group consisting of silica gel and silica-zirconia gel, said inorganic oxide gel being characterized by a pore volume of at least 0.8 cc. per gram, together with (2) a particulate weighting agent selected from the group consisting of clay, zircon and alpha alumina, said weighting agent being present in such amount as to yield a resulting composite having a packed density of at least 0.3 gram/cc.

2. The composition of claim 1 wherein said weighting agent is clay.

3. The composition of claim 2 wherein said inorganic oxide gel is silica.

4. The composition of claim 2 wherein said inorganic oxide gel is silica-zirconia.

5. The composition of claim 2 wherein the matrix contains from about 20 to 95 weight percent inorganic oxide gel and from about 5 to 80 weight percent of said clay, said clay particles having a weight mean particle size of less than about 40 microns.

6. The composition of claim 2 wherein said crystalline aluminosilicate particles have a weight mean particles size of less than about 40 microns, said crystalline aluminosilicate being present in said composite in an amount of from about 1 to 80 weight percent.

7. The composition of claim 2 wherein said crystalline aluminosilicate particles are crystalline Y aluminosilicate having been base exchanged with a solution of cations selected from the group consisting of the cations of elements of Groups I-B–VIII of the Periodic Table, hydrogen, hydrogen precursors and mixtures thereof with one another.

8. The composition of claim 7 wherein said cations are rare earth cations.

9. The composition of claim 2 wherein said crystalline aluminosilicate particles are crystalline X aluminosilicate having been base exchanged with a solution of cations selected from the group consisting of the cations of elements of Groups I-B–VIII of the Periodic Table, hydrogen, hydrogen precursors and mixtures thereof with one another.

10. The composition of claim 9 wherein the cations are rare eath cations.

11. The composition of claim 1 wherein said inorganic oxide gel is characterized by an alpha ($\alpha$) value of less than 0.1.

12. The composition of claim 11 wherein said inorganic oxide gel is characterized by a pore volume of from about 0.8 to 1.3 gram/cc.

13. The composition of claim 10 wherein:
said crystalline aluminosilicate is characterized by a weight mean particle size of from about 0.1 to 20 microns and is present in said composite in an amount from about 2 to 20 weight percent;
said inorganic oxide gel is characterized by a pore volume of from about 0.8 to 1.3 cc. per gram and an alpha ($\alpha$) value of less than 0.01;
said clay is characterized by weight mean particle size of from about 0.1 to 20 mircrons;
said matrix contains from about 50 to 70 percent by weight of said inorganic oxide gel and 30 to 50 percent by weight of said clay;
the packed density of said composite is from about 0.4 to 0.6 gram/cc.; and
said composition is in the form of particles of from about 1 to 200 microns.

14. The composition of claim 4 wherein the amount of zirconia in said inorganic oxide gel is from about 0.5 to 25 percent by weight.

15. A process for catalytically converting petroleum stacks comprising contacting a petroleum charge stream under catalytic conversion conditions with the catalyst of claim 1.

16. The process of claim 15 wherein the conversion process is catalytic cracking.

17. A process for catalytically cracking petroleum stocks comprising contacting a petroleum charge stream under catalytic cracking conditions with the catalyst of claim 2.

18. A process for catalytically cracking petroleum stocks comprising contacting a petroleum charge stream under catalytic cracking conditions with the catalyst of claim 13.

19. A process for preparing the catalyst of claim 1 comprising admixing an alkali metal silicate with a particulate weighting agent selected from the group consisting of clay, zircon and alpha alumina, so as to coat said particles with alkali metal silicate, ageing the admixture at a pH of from about 8 to 10, reducing the pH to from about 4 to 7 to form a silica gel-weighting agent matrix, admixing particulate crystalline aluminosilicate with said matrix so as to to disperse said aluminoscilate particles therein to form a composite, said composite having a sodium content of less than 4 percent by weight, and drying in the form of composite particles suitabie for fluid catalytic conversion.

20. The process of claim 19 wherein, after said ageing at a pH of from about 8 to 10 and prior to reducing the pH to from about 4 to 7, a source of zirconium ions is added, so that the subsequent reduction of pH results in the formation of a silica gel-zirconia gel-weighting agent matrix.

21. The process of claim 19 wherein said ageing is carried out at a temperature of from about 100 to 160° F. for from about 1 to 6 hours.

22. The process of claim 21 wherein said pH of 8 to 10 and said pH of 4 to 7 are each attained by the addition of sulfuric acid.

23. The process of claim 19 wherein said weighting agent is kaolin clay.

24. The process of claim 19 wherein said crystalline aluminosilicate particles are either crystalline Y aluminosilicate or crystalline X aluminosilicate, said crystalline aluminosilicate having been base exchanged with a solution of cations selected from the group consisting of the cations of elements of Groups I–B–VIII of the Periodic Table, hydrogen, hydrogen precursors and mixtures thereof with one another.

25. The process of claim 24 wherein said cations are rare earth cations.

26. The process of claim 19, wherein after admixing said aluminosilicate particles to form said composite, said composite is separated and spray dried to produce composite particles having a weight mean particle size of from about 1 to 200 microns.

27. A matrix suitable for the incorporation of an active catalytic component therein, said matrix comprising from about 20 to 95 weight percent of inorganic oxide gel selected from the group consisting of silica gel and silica-zirconia gel and from about 5 to 80 weight percent of a particulate weighting agent selected from the group consisting of clay, zircon and alpha alumina, said inorganic oxide gel being characterized by a pore volume of at least 0.8 cc. per gram and by an alpha ($\alpha$) value of less than 0.1.

28. The matrix of claim 27 wherein said clay is kaolin clay and wherein said inorganic gel is characterized by a pore volume of from about 0.8 to 1.3 cc. per gram and by an alpha ($\alpha$) value of less than 0.05.

29. The matrix of claim 27 wherein the inorganic oxide gel is silica gel.

30. The matrix of claim 27 wherein the inorganic oxide gel is silica-zirconia gel.

31. The matrix of claim 30 wherein the amount of zirconia in said inorganic oxide gel is from about 0.5 to 25 percent by weight.

32. A process for preparing the matrix of claim 27 comprising admixing an alkali metal silicate with a particulate clay so as to coat said particles with alkali metal silicate, ageing the admixture at a pH of from about 8 to 10, reducing the pH from about 4 to 7 to form a silica gel-clay matrix, and drying in the form of composite particles suitable for fluid catalytic conversion.

33. The process of claim 32 wherein, after said ageing at a pH of from about 8 to 10 and prior to reducing the pH to from about 4 to 7, a source of zirconium ions is added, so that the subsequent reduction of pH results in the formation of a silica gel-zirconia gel-clay matrix.

34. The process of claim 32 wherein said ageing is carried out at a temperature of from about 100 to 160° F. for from about 1 to 6 hours.

35. The process of claim 32 wherein said drying is effected by spray drying so as to produce particles having a weight mean particle size of from about 1 to 200 microns.

36. The process of claim 33 wherein said pH of 8 to 10 and said pH of 4 to 7 are each attained by the addition of sulfuric acid.

References Cited

UNITED STATES PATENTS

| | | | |
|---|---|---|---|
| 2,763,622 | 9/1956 | Plank et al. | 252—451 |
| 3,262,890 | 7/1966 | Mitchell et al. | 252—455 |
| 3,312,615 | 4/1967 | Cramer et al. | 252—455X |

DANIEL E. WYMAN, Primary Examiner

C. F. DEES, Assistant Examiner

U.S. Cl. X.R.

252—451, 453, 455

UNITED STATES PATENT OFFICE
CERTIFICATE OF CORRECTION

Patent No. 3,553,104          Dated January 5, 1971

Inventor(s) WILLIAM A. STOVER and HARRY A. MC VEIGH

It is certified that error appears in the above-identified patent and that said Letters Patent are hereby corrected as shown below:

Col. 4, line 48 - "about 8 ot 10" should be --about 8 to 10
Col. 7, line 25 - "monaqueous" should be --non-aqueous--
Col. 14, line 28 - "alumina salt as to provide 13% alumina and 87%" should be --An aqueous slurry of 4% of freshly precipitated--
Col. 20, line 63 - "suufides" should be --sulfides--
Col. 22, line 16 - "composition" should be --composite--
Col. 22, line 22 - "stacks" should be --stocks--

Signed and sealed this 17th day of August 1971.

(SEAL)
Attest:

EDWARD M. FLETCHER, JR.
Attesting Officer

WILLIAM E. SCHUYLER, JR.
Commissioner of Patents